July 28, 1959 G. JACOBSSON 2,896,609
COFFEE PREPARING APPARATUS
Filed Feb. 3, 1955 2 Sheets-Sheet 1

Inventor:
Gösta Jacobsson,
by Pierce, Scheffler + Parker
Attorneys.

July 28, 1959 G. JACOBSSON 2,896,609
COFFEE PREPARING APPARATUS
Filed Feb. 3, 1955 2 Sheets-Sheet 2
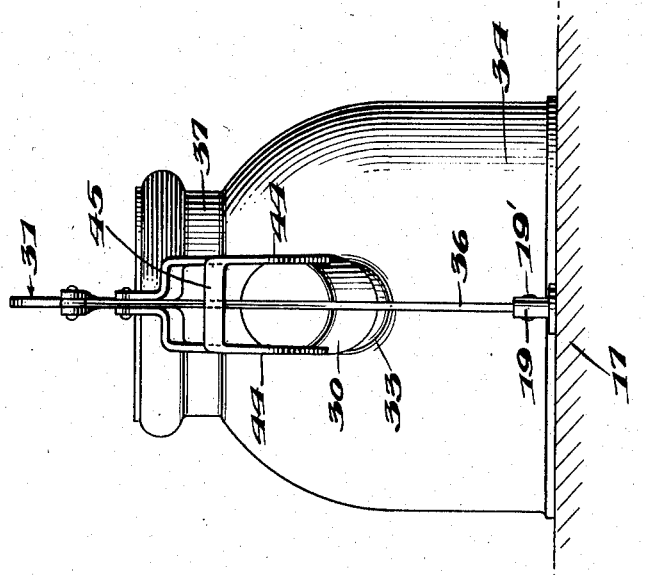
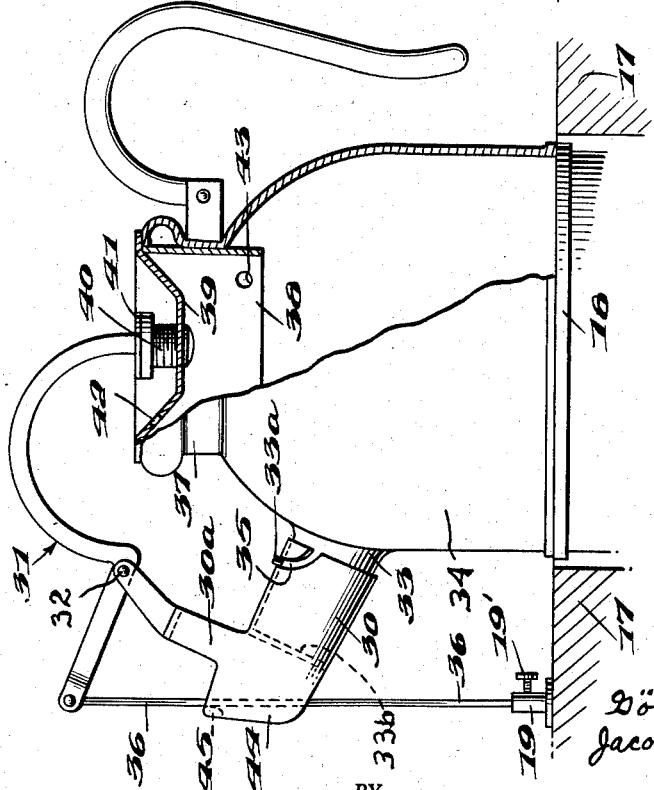
INVENTOR
Gösta Jacobsson
BY Pierce, Scheffler & Parker
ATTORNEYS

| United States Patent Office | 2,896,609
Patented July 28, 1959 |
|---|---|

2,896,609

COFFEE PREPARING APPARATUS

Gösta Jacobsson, Gullspang, Sweden, assignor to Bertil Adamson, Otterbacken, Sweden Application February 3, 1955, Serial No. 485,964

Claims priority, application Sweden February 11, 1954

6 Claims. (Cl. 126—374)

This invention relates to an improvement of a coffee-preparing apparatus the spout of which is provided with a closure cap, the apparatus being provided with a device actuated by the steam pressure in the casing for preventing the coffee from boiling over and for boiling for a long time by lifting the apparatus partly off from the heating plate or the stove.

The invention is illustrated by two embodiments in the accompanying drawing in which Fig. 1 is a side view, partly in section, of a coffee-preparing apparatus according to the invention, in the position assumed by the coffee-preparing apparatus before the contents thereof boil.

Fig. 3 is a side view, partly in section, of another embodiment of the apparatus.

Fig. 4 is a front view of the embodiment of Fig. 3.

Figure 1:
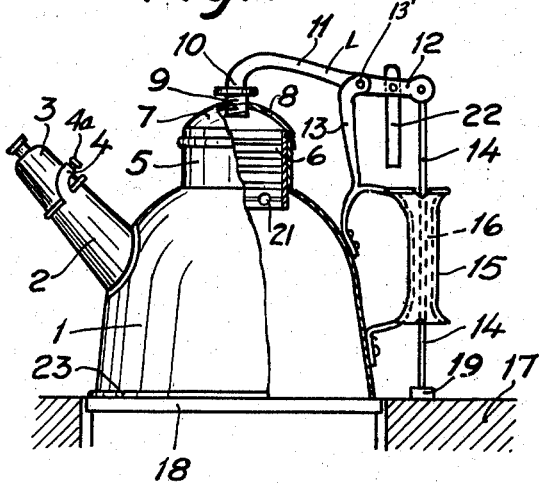
Figure 2:
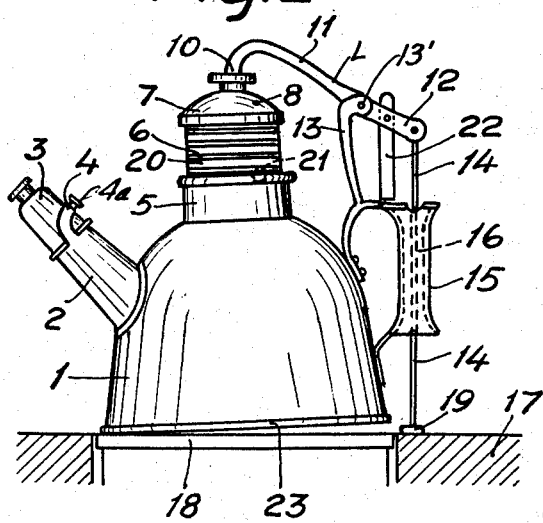
Fig. 2 is a corresponding side view of the apparatus when the contents thereof have reached the boiling stage.

Referring now to Figs. 1 and 2 of the drawings, the coffee-preparing apparatus includes a casing 1 provided with a spout 2 having a cap 3 removably secured thereto by means of the cam slot 4 and the spout projection 4a. The casing has a cylindrical neck 5 in the top portion thereof in which is slidably mounted a hollow piston 6. Piston 6 is open at the bottom and has a vaulted upper end wall 7 threadably secured to the upper end thereof. Threadably mounted in an aperture in the top portion of the vaulted end wall 7 is an adjustment screw 9 against the upper surface of which the extremity 10 of one arm 11 of a two-armed lever L rests. The lever is pivotally conected by pivot 13' to support 13 attached to the casing 1, the second arm 12 being pivotally attached to a rod or bar 14 which is displaceably guided in a guide member attached to the casing 1, which guide member, in the embodiment shown, is the handle 15 of the apparatus which therefore is provided with a central passage 16.

The length of the bar 14 is so dimensioned that, when the casing 1 is placed on the heating means 18 mounted in the upper surface of the fixed support 17 (thas is, on the boiling plate of a stove, for example) member 19 secured to the lower end of the bar 14 will be seated upon the stove 17.

In the adjustment screw 9 or in some other portion of the vaulted end wall 7 there is made a small hole 8, the diameter of which is a function of the size of the boiler 1 (for example, when the boiler holds 1.5 ltr. the hole should be about 0.3 mm.). In order to reduce the friction between the piston 6 and the cylindrical neck 5 the piston is provided with peripheral grooves 20. In the lower portion of the piston 6, some distance from the lower edge a comparatively large hole 21 is made through which the steam generated is emitted when the lower edge of the piston 6 is positioned near the upper edge of the cylindrical neck.

To one arm 12 of the lever L there is attached a movable stop 22 which cooperates with the handle 15 or some other member of the casing 1 to limit the motion of the lever L so that the piston will not be urged upwardly entirely out of the cylindrical neck 5.

The mode of operation of the device is as follows:

When the casing 1 has been filled with water and coffee, the cap 3 is fitted on the spout 2 and the piston 6 is introduced into the neck 5, after which the lever L is placed with its end 10 against the adjustment screw 9. Thereafter the coffee-making apparatus is placed on a boiling plate 18 so that the member 19 secured to the lower end of the bar 14 rests upon the stove or fixed support 17.

When the heat is applied to the casing 1, the vapor pressure above the liquid level increases and vapor is vented through the small aperture 8. When the coffee boils, steam is generated so rapidly that it cannot completely be emitted through the hole 8 so that the pressure in the casing increases and urges the piston 6 upwards. The level L is swung in the clockwise direction and raises the casing relative to the rod 14 until the stop 22 strikes against the handle 15 and the large hole 21 will be positioned above the upper edge of the neck 5 to allow the steam generated to be emitted therethrough. By the motion of the piston 6 the lever L lifts the casing 1 so that the apparatus pivots on the front edge of its flat bottom surface 23. Thus, the bottom of the casing is removed from the heating means 18 and the boiling ceases.

In the embodiment shown in Figs. 3 and 4, the cap 30, to which lever 31 is pivotally connected by pivot pin 32, is secured on the spout 33 of the casing 34 by means of slot 35 and the spout pin 33a. The cap 30, lever 31, and the bar 36 may be removed as a unit from the casing 34, whereupon the apparatus has the appearance of the usual coffee pot. The cap 30 serves to close the pouring extremity 33b of spout 33 in a fluid-tight manner.

As in the embodiment of Figs. 1 and 2, the casing 34 of Fig. 3 has a neck portion 37 at the top thereof in which is slidably mounted the hollow piston 38. Piston 38 is open at the bottom and has an upper end wall 39. Threadably mounted in an aperture in the upper end wall 39 is an adjustment screw 40 against the upper surface of which the extremity 41 of lever 31 rests.

The piston 38 has gas vent holes 42, 43 which function in the manner of apertures 8 and 21, respectively, of Figs. 1 and 2.

The cap 30 is provided with two parallel, spaced vertical plates 44 (see Fig. 4) connected at their upper portions by the transverse member 45 to form a vertical passage therebetween. Thus as the pressure builds up within the casing 34, piston 38 moves upwardly to pivot lever 31 in the counter-clockwise direction about pivot 32; the cap 30 and the pouring spout 33 secured thereto will thus be raised upwardly to lift the spout side of the casing from the heating element. Transverse member 45 connected intermediate the upper extremities of the plates 44 limits the swinging motion of the bar so as to normally maintain the bar in the vertical passage between the plates 44.

As various stoves have boiling plates of different heights, the adjustment screw 41 often does not provide a sufficient degree of adjustability and therefore, if desired, the support contacting member 19 may be adjustably connected longitudinally relative to bar 36 by means of set screw 19'.

The device prevents the coffee from boiling over since the apparatus can be lifted from the plate at any temperature desired by suitable dimensioning of the piston. This is very important since it is desired that coffee shall not boil over but only simmer at 90–96° centigrade. The apparatus according to the invention is preferably lifted from the heating plate at 90° centigrade, and afterwards a temperature of 94° centigrade is maintained. By use of a somewhat smaller piston the operating temperature increases, since a greater pressure is then required for lifting the apparatus. A tolerance of about 0.2–0.25 mm. between the piston and the cylinder is to be preferred.

Having now described my invention, what I claim as new and desire to secure by Letters Patent is:

1. In combination with a liquid heating vessel adapted to be placed upon heating means mounted in the upper surface of a fixed support, said vessel having a casing with an opening in the upper portion thereof and a lower portion adapted to rest on said heating means; the invention which comprises pressure responsive means actuated by vapor pressure within the vessel casing for partially lifting said vessel from said heating means comprising a piston adapted to close the casing opening and vertically slidably movable in said casing opening, a substantially vertical lifting bar slidably movable relative to said casing and adapted to cooperate at its lower end with said fixed support, and a lever pivotally connected intermediate its ends to said casing, one end of said lever being connected to said piston and the other end of said lever being connected to said lifting bar, whereby upon increase of vapor pressure within said vessel, said piston will move upwardly to pivot said lever in a direction to cause said lifting bar to raise the vessel from the heating means.

2. Vessel lifting means as defined in claim 1 wherein said vessel casing has a cylindrical neck around said opening.

3. Vessel lifting means as defined in claim 2 wherein said piston is slidably movable within said casing cylindrical neck, and further wherein said piston is hollow and open at its lower end, said piston having an upper end wall with a small opening therein, the peripheral wall of said piston having a larger opening therein adjacent its lower edge, whereby when said piston is moved upwardly by the increased vapor pressure within the vessel the opening in the peripheral wall of the piston will be above the upper extremity of the casing cylindrical neck to vent the vapor within the vessel.

4. Vessel lifting means as defined in claim 1 wherein said lever is connected at one end to said piston by means of an adjustment member threadably connected to said piston.

5. Vessel lifting means as defined in claim 1 wherein said vessel casing has a handle secured thereto, said lifting bar being slidably mounted in said handle, and further including a stop member secured to said lever and adapted to cooperate with said handle to limit the degree of movement of said lever and said piston.

6. In combination with a liquid heating vessel adapted to be placed upon heating means mounted in the upper surface of a fixed support, said vessel having a casing with an opening in the upper portion thereof and a lower portion adapted to rest on said heating means, said casing also having a pouring spout closed by a cap member removably secured thereto; the invention which comprises pressure responsive means actuated by vapor pressure within the vessel casing for partially lifting said vessel from said heating means comprising a piston adapted to close the casing opening and vertically slidably movable in said casing opening, a substantially vertical lifting bar slidably movable relative to said casing and adapted to cooperate at its lower end with said fixed support, and a lever pivotally connected intermediate its ends to said cap member, one end of said lever being connected to said piston and the other end of said lever being connected to said lifting bar, whereby upon increase of vapor pressure within said vessel, said piston will move upwardly to pivot said lever in a direction to cause said lifting bar to raise the vessel from the heating means.

References Cited in the file of this patent

UNITED STATES PATENTS

| | | |
|---|---|---|
| 291,064 | Lockwood | Jan. 1, 1884 |
| 1,259,257 | Malcamp | Mar. 12, 1918 |
| 1,392,761 | Harrison | Oct. 4, 1921 |
| 1,414,506 | Fulton | May 2, 1922 |

FOREIGN PATENTS

| | | |
|---|---|---|
| 837,802 | France | Nov. 18, 1938 |
| 3,500 | Great Britain | 1912 |
| 453,587 | Great Britain | June 14, 1935 |
| 71,171 | Norway | Oct. 21, 1946 |
| 131,832 | Sweden | May 29, 1951 |
| 178,181 | Switzerland | Sept. 16, 1935 |